US012359482B2

(12) United States Patent
Holzapfel

(10) Patent No.: US 12,359,482 B2
(45) Date of Patent: Jul. 15, 2025

(54) FURNITURE DRIVE

(71) Applicant: Julius Blum GmbH, Hoechst (AT)

(72) Inventor: Andreas Holzapfel, Bregenz (AT)

(73) Assignee: JULIUS BLUM GMBH, Hoechst (AT)

( * ) Notice: Subject to any disclaimer, the term of this patent is extended or adjusted under 35 U.S.C. 154(b) by 364 days.

(21) Appl. No.: 17/518,818

(22) Filed: Nov. 4, 2021

(65) Prior Publication Data

US 2022/0056745 A1 Feb. 24, 2022

Related U.S. Application Data

(63) Continuation of application No. PCT/AT2020/060152, filed on Apr. 15, 2020.

(30) Foreign Application Priority Data

May 17, 2019 (AT) .............................. A 50448/2019

(51) Int. Cl.
*E05D 15/40* (2006.01)
*E05D 3/16* (2006.01)
(Continued)

(52) U.S. Cl.
CPC ............... *E05D 15/40* (2013.01); *E05D 3/16* (2013.01); *E05F 1/1058* (2013.01); (Continued)

(58) Field of Classification Search
CPC ..... E05D 15/40; E05D 15/401; E05D 15/463; E05D 3/16; E05D 2003/163; E05F 1/1058; E05F 1/1261; E05F 1/10; E05F 5/02; E05Y 2201/10; E05Y 2201/11; E05Y 2201/256; E05Y 2201/264; E05Y 2201/492;
(Continued)

(56) References Cited

U.S. PATENT DOCUMENTS 3,249,273 A * 5/1966 Robinson ........... A47K 10/3827 226/129
4,614,374 A * 9/1986 Lannert ..................... E05B 9/08 292/DIG. 68
(Continued)

FOREIGN PATENT DOCUMENTS

AT 515661 B1 * 11/2015 ............. E05D 15/40
AT 522446 A4 * 11/2020 ............. E05D 15/40
(Continued)

OTHER PUBLICATIONS

DE202017102814 English translation (Year: 2018).*
International Search Report issued Jun. 25, 2020 in International (PCT) Application No. PCT/AT2020/060152.

*Primary Examiner* — Janet M Wilkens
(74) *Attorney, Agent, or Firm* — Wenderoth, Lind & Ponack, L.L.P.

(57) ABSTRACT

A furniture drive can move a furniture part movably supported relative to a furniture carcass. The furniture drive includes a housing configured to be at least partially received within a recess of a furniture panel of the furniture carcass in a mounted condition, and an actuating arm arrangement for moving the movable furniture part. A cover is provided on the housing of the furniture drive, and the cover has at least one laterally protruding, substantially hoop-shaped flange.

12 Claims, 4 Drawing Sheets

(51) Int. Cl.
*E05F 1/10* (2006.01)
*E05F 1/12* (2006.01)
*E05F 5/02* (2006.01)

(52) U.S. Cl.
CPC .............. *E05F 1/1261* (2013.01); *E05F 5/02* (2013.01); *E05D 2003/163* (2013.01); *E05Y 2201/10* (2013.01); *E05Y 2201/256* (2013.01); *E05Y 2201/264* (2013.01); *E05Y 2201/499* (2024.05); *E05Y 2201/638* (2013.01); *E05Y 2600/10* (2013.01); *E05Y 2600/41* (2013.01); *E05Y 2900/20* (2013.01)

(58) Field of Classification Search
CPC ........... E05Y 2201/638; E05Y 2600/10; E05Y 2600/41; E05Y 2600/452; E05Y 2900/20
USPC ..... 312/325, 327, 328, 242, 306, 312, 319.2
See application file for complete search history.

(56) References Cited

U.S. PATENT DOCUMENTS

| | | | | |
|---|---|---|---|---|
| 6,601,931 | B1 * | 8/2003 | Schairbaum | A47B 21/007 108/26 |
| 7,228,659 | B2 | 6/2007 | Romero et al. | |
| 7,497,050 | B2 | 3/2009 | Romero et al. | |
| 7,562,757 | B2 * | 7/2009 | Dubach | E05F 5/00 312/319.2 |
| 8,894,162 | B2 * | 11/2014 | Kashiwaguma | E05F 1/1058 312/319.2 |
| 10,407,963 | B2 | 9/2019 | Salice | |
| 10,487,554 | B2 * | 11/2019 | Lubetz | F16H 25/18 |
| 10,588,407 | B2 | 3/2020 | Held | |
| 10,722,031 | B2 | 7/2020 | Sobolewski et al. | |
| 10,820,701 | B2 * | 11/2020 | Sobolewski | E05D 15/463 |
| 10,876,336 | B2 * | 12/2020 | Kruedener | E05D 5/02 |
| 10,881,207 | B2 * | 1/2021 | Sobolewski | F16B 12/14 |
| 11,085,218 | B2 * | 8/2021 | Herper | E05F 1/1246 |
| D932,869 | S * | 10/2021 | Holzapfel | D8/323 |
| 11,350,747 | B2 * | 6/2022 | Poppenborg | E05D 15/46 |
| 2002/0043033 | A1 * | 4/2002 | Szyjkowski | E04F 19/08 52/213 |
| 2005/0150168 | A1 | 7/2005 | Romero et al. | |
| 2006/0284530 | A1 * | 12/2006 | Hollenstein | E05F 3/106 312/325 |
| 2007/0163083 | A1 | 7/2007 | Eberl | |
| 2007/0180774 | A1 | 8/2007 | Romero et al. | |
| 2009/0307869 | A1 | 12/2009 | Salice | |
| 2010/0084535 | A1 * | 4/2010 | Cvek | F16M 11/10 248/404 |
| 2017/0204645 | A1 * | 7/2017 | Lubetz | F16H 25/18 |
| 2018/0252016 | A1 | 9/2018 | Salice | |
| 2019/0166992 | A1 * | 6/2019 | Held | A47B 77/14 |
| 2019/0316394 | A1 * | 10/2019 | Kruedener | E05D 7/123 |
| 2019/0383079 | A1 * | 12/2019 | Sobolewski | E05D 15/463 |
| 2020/0008578 | A1 | 1/2020 | Sobolewski et al. | |
| 2020/0362612 | A1 | 11/2020 | Nordieker et al. | |
| 2021/0010311 | A1 * | 1/2021 | Nordieker | E05F 1/1261 |
| 2022/0056747 | A1 * | 2/2022 | Holzapfel | E05D 15/40 |
| 2023/0258035 | A1 * | 8/2023 | Reissig | E05F 1/1246 16/72 |
| 2023/0265699 | A1 * | 8/2023 | Baldreich | E05D 15/40 49/381 |

FOREIGN PATENT DOCUMENTS

| | | | | | |
|---|---|---|---|---|---|
| AT | 524391 | A1 | * | 5/2022 | E05D 11/1021 |
| AT | 527071 | A1 | * | 10/2024 | E05D 15/40 |
| CA | 2252309 | A1 | * | 4/2000 | A47B 81/005 |
| CN | 203603660 | | | 5/2014 | |
| CN | 105587197 | A | * | 5/2016 | |
| CN | 206053635 | U | * | 3/2017 | |
| CN | 108024627 | | | 5/2018 | |
| CN | 113853469 | A | * | 12/2021 | E05D 15/32 |
| DE | 10 2017 104 170 | | | 8/2018 | |
| DE | 102017104169 | | * | 8/2018 | |
| DE | 102017104185 | A1 | * | 8/2018 | A47B 96/205 |
| DE | 102017194185 | | * | 8/2018 | |
| DE | 202017102814 | | * | 8/2018 | |
| DE | 20 2017 102 809 | | | 9/2018 | |
| DE | 20 2017 102 812 | | | 9/2018 | |
| JP | 2003-239616 | | | 8/2003 | |
| JP | 2007-39901 | | | 2/2007 | |
| JP | 2007-514080 | | | 5/2007 | |
| JP | 2018-514670 | | | 6/2018 | |
| WO | 2008/031814 | | | 3/2008 | |
| WO | 2016/156514 | | | 10/2016 | |
| WO | WO-2018192819 | A1 | * | 10/2018 | E05D 3/16 |
| WO | 2019/091968 | | | 5/2019 | |
| WO | WO-2021212159 | A1 | * | 10/2021 | E05D 15/40 |

* cited by examiner

FURNITURE DRIVE

BACKGROUND OF THE INVENTION

The present invention relates to a furniture drive for moving a furniture part movably-supported relative to a furniture carcass. The furniture drive includes a housing configured to be at least partially received within a recess of a furniture panel of the furniture carcass in a mounted condition, and an actuating arm arrangement for moving the movable furniture part.

Moreover, the invention concerns an item of furniture comprising a furniture carcass, a furniture part movably-supported relative to the furniture carcass, and a furniture drive of the type to be described for moving the movable furniture part.

The housing of such furniture drives is usually fixed to a sidewall of the furniture carcass. The actuating arm arrangement of the furniture drive is pre-stressed by at least one force storage member and is connected to the movable furniture part in a mounted condition.

In recent times, manufacturers have started to integrate the housing of the furniture drive at least partially within a recess of a furniture panel of the furniture carcass (for example as shown in WO 2019/091968 A1). As a result, the furniture drive does hardly come into appearance from a visual point of view. In such an installation situation, a recess-for example in the form of a blind hole-is produced in the furniture panel, and the housing can be inserted into that blind hole during assembly. For example, the recess is produced by milling, and there is the considerable risk, in particular with coarser fibers of the wood material, that a visible edge of the recess becomes frayed and does therefore come unattractively into appearance. Moreover, positioning of the housing within the recess has difficulties, because with a housing integrated within the recess, a gap remains between the housing and a wall of the recess.

DE 20 2017 102 812 U1 discloses a furniture drive with a housing configured to be entirely received within a sidewall of the furniture carcass in a mounted condition. In FIG. 3, a front face section (reference number 21) is shown, the front face section being arranged flush with a narrow front face of the sidewall. The face section 21 includes a rectangular recess through which the pivoting arms of the pivoting arm arrangement are passed through.

WO 2008/031814 A1 discloses an opening and closing device for movable furniture parts, and a magnetic element is arranged on a linearly displaceable slider. The front-end region of the device is closed by a sleeve having a widened flange bearing against the carcass in a mounted condition.

SUMMARY OF THE INVENTION

It is an object of the present invention to provide a furniture drive mentioned in the introductory part, thereby avoiding at least one of the above-discussed drawbacks.

According to the invention, a cover is provided on the housing of the furniture drive, the cover having at least one laterally protruding, substantially ring-shaped flange.

The lateral flange of the cover—depending on the installation situation of the furniture drive—can have the following advantages:

1.) A rear side of the laterally protruding flange of the cover can form a depth-stop for the housing of the furniture drive in a mounted condition, the depth-stop being configured to bear against the furniture panel, preferably against a front face of the furniture panel. In this way, the housing of the furniture drive adopts a defined depth position in relation to the furniture panel in a mounted condition.

2.) The laterally protruding flange of the cover can be configured to cover a gap arranged between the housing and an inner wall of the recess. In this way, this gap no longer comes into appearance from a visual point of view.

3.) The laterally protruding flange of the cover can be configured to cover an edge of the furniture panel in a mounted condition of the furniture drive, the edge being arranged between a front face of the furniture panel and a wall of the recess. In this way, a laborious finishing of that edge can be omitted, even when the edge is somewhat frayed.

4.) A portion of the laterally protruding flange can be configured to bear against a rabbet retreating from the front face of the furniture panel in a mounted condition of the furniture panel, so that a front side of the flange is aligned flush with the front face of the furniture panel. Besides a flush arrangement between the front side of the flange and the front face of the furniture panel, an outer edge of the flange can form a side stop configured to bear against the rabbet. In this way, the housing of the furniture drive, in a mounted condition, can achieve a defined side position and/or a defined height position in relation to the furniture panel.

Within the scope of the present invention, the term “mounted condition” is always to be understood as the appropriate and usual installation position of the furniture drive.

The cover of the furniture drive, when the furniture drive is in a mounted condition, faces towards the movable furniture part and is arranged in the front region of the housing.

The housing of the furniture drive, for example, can be configured substantially cuboidal. The cover, in a mounted condition of the housing on the furniture panel, is arranged on a front narrow side of the cuboidal housing.

According to an embodiment, the housing of the furniture drive includes a first housing wall and a second housing wall, the second housing wall being at least partially spaced from the first housing wall. An opening is formed between the first housing wall and the second housing wall, and the cover is arranged in a region of that opening. The actuating arm arrangement of the furniture drive can include at least one movably-supported actuating arm protruding through the opening of the housing in at least one relative position.

The cover can surround the opening of the housing in a substantially ring-shaped manner, and the actuating arm of the actuating arm arrangement protruding through the opening of the housing extends through the ring-shaped cover in at least one relative position.

The cover, in a mounted condition and in a front view onto the furniture carcass, can be substantially rectangular-shaped.

The cover can have an L-shaped portion (L-shaped cross section) at least over a region. A first limb of the L-shaped portion, in a mounted condition of the furniture drive, bears against a front face of the furniture panel. Alternatively, the first limb of the L-shaped portion, in a mounted condition of the furniture drive, bears against a rabbet retreating from the front face of the furniture panel, so that an outer side of the L-shaped portion is configured to be flush with the front face of the furniture panel. A second limb of the L-shaped portion, on the contrary, can reach into the interior of the furniture panel in a mounted condition of the furniture drive.

The cover is connected to the housing of the furniture drive or, in an alternative way, can be configured to be releasably connected to the housing. This can be accomplished, for example, by a least one snap-connection device by which the cover can be connected to the housing without the use of a tool and can be detached without the use of a tool.

The cover can be formed by a material differing from the material of the housing. Preferably, the material of the cover can be nickel-plated. For example, the material of the cover can be made of metal, plastic or of a compound material.

BRIEF DESCRIPTION OF THE DRAWINGS

Further details and advantages of the present invention will be evident from the following description of figures, in which.

DETAILED DESCRIPTION OF THE INVENTION

Figure 1A:
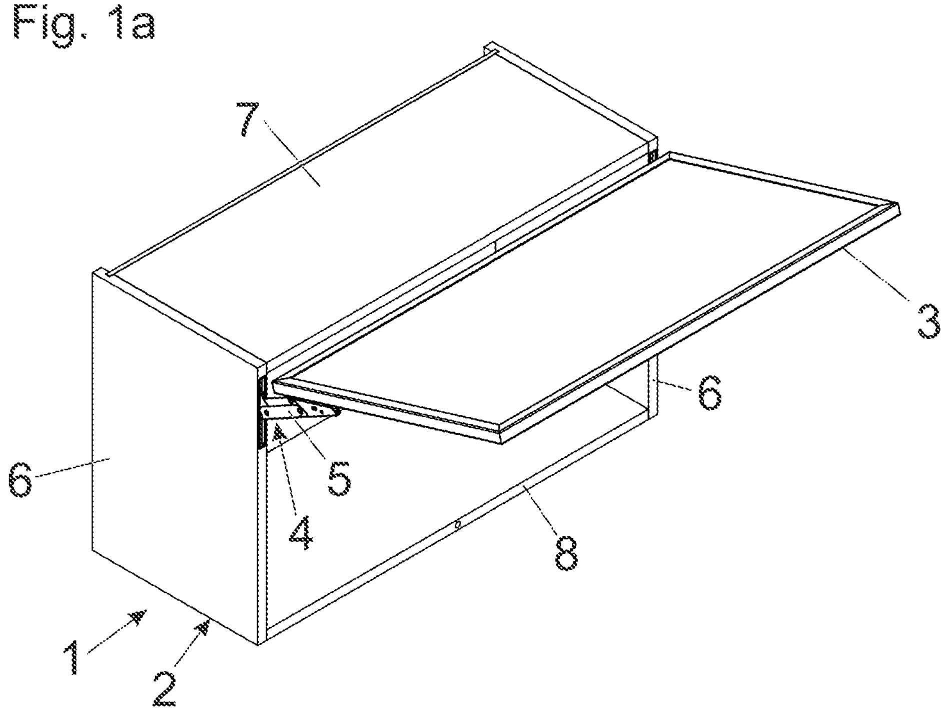
FIGS. 1*a*, 1*b* show an item of furniture comprising a movable furniture part in a perspective view and in an exploded view.

FIG. 1*a* shows a perspective view of an item of furniture 1 comprising a furniture carcass 2, a furniture part 3 movably supported relative to the furniture carcass 2, and at least one furniture drive 4 for moving the movable furniture part 3. The item of furniture 1 includes furniture panels 6 in the form of sidewalls, a top panel 7 and a bottom panel 8. In the shown embodiment, the furniture drive 4 is at least partially, preferably substantially entirely, integrated into the sidewall formed by a furniture panel 6. The movable furniture part 3 is movably supported relative to the furniture carcass 2 between a closed position in which the furniture carcass 2 is covered, and an elevated open position. Of course, it is also possible to integrate the furniture drive 4 into a horizontally extending furniture panel, thus, for example, into the top panel 7, into the bottom panel 8 and/or into a shelf arranged between the top panel 7 and the bottom panel 8. In such a case, the movable furniture part 3 is pivotally supported relative to the furniture carcass 2 about a vertically extending axis in the mounted position. The furniture drive 4 includes an actuating arm arrangement 5 for moving the movable furniture part 3 and at least one force storage member 10 (FIG. 1*b*) for applying a force to the actuating arm arrangement 5.

Figure 1B:
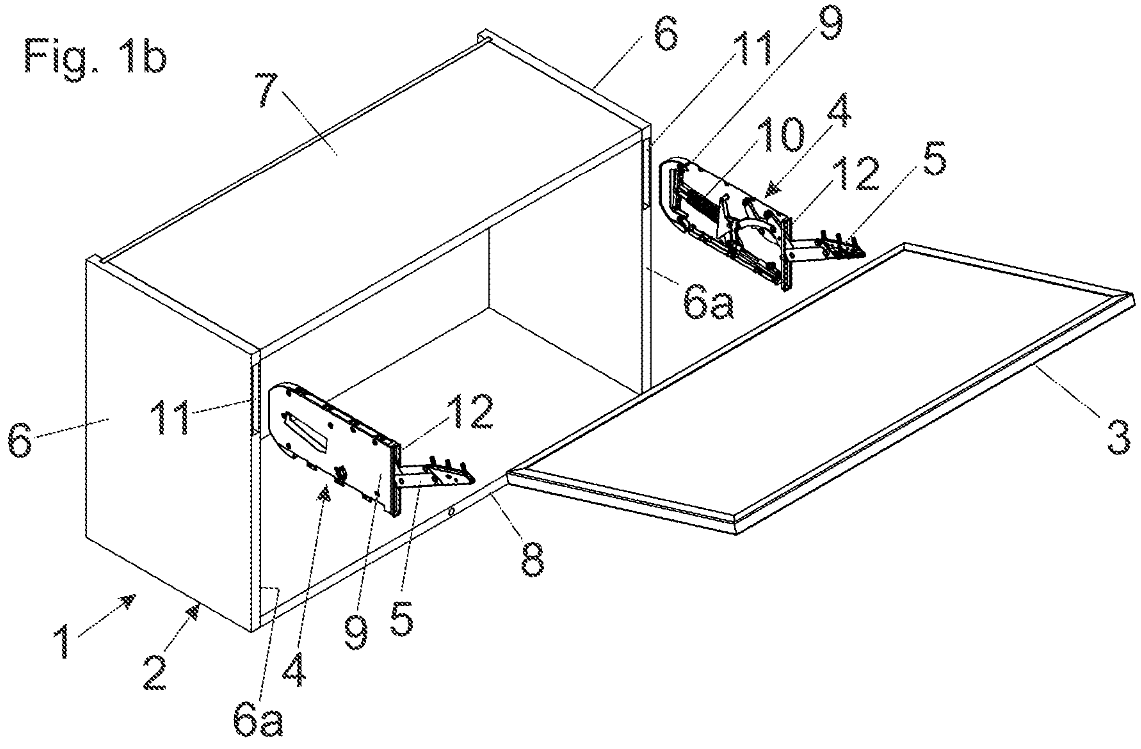

FIG. 1*b* shows the item of furniture 1 in an exploded view. Two furniture drives 4, preferably identical in construction, are provided for moving the movable furniture part 3. Each of the furniture drives 4 includes a housing 9 which, in the mounted condition, is at least partially, preferably substantially entirely, received within a recess 11 of the sidewalls formed by the furniture panels 6. In a mounted condition, the housing 9 is arranged substantially flush with a front face 6*a* of the furniture panel 6. The recess 11 can be configured, for example, as a blind hole. The housing 9 is configured to be inserted, when mounted, from the front (that is to say from the narrow front face 6*a* of the furniture panel 6) into the pocket-shaped recess 11. In the housing 9, at least one force storage member 10 (for example one or a plurality of compression springs) is arranged for applying a force to the actuating arm arrangement 5. A cover 12 is provided on the front-end region of the housing 9, and at least one movably-supported actuating arm 5*a*, 5*b*, 5*c* (FIG. 2*a*) of the actuating arm arrangement 5, in a relative position, can be guided through the cover 12.

Figure 2A:
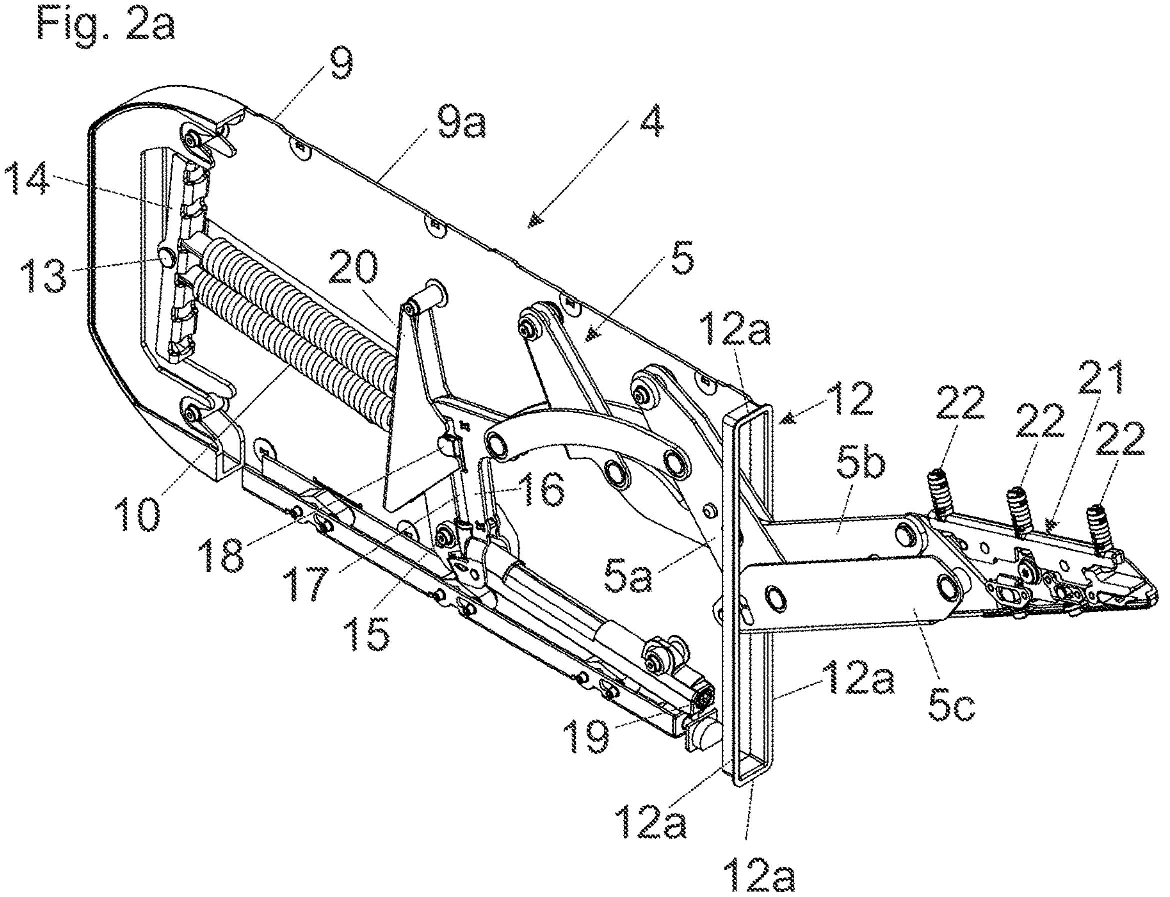
FIGS. 2*a*, 2*b* show a furniture drive having a first housing wall and a second housing wall in perspective views.

FIG. 2*a* shows the furniture drive 4 in a perspective view. The housing 9 includes at least one, preferably flat-shaped, housing wall 9*a*. A bearing portion 14 pivotable about an axis 13 is arranged on the housing wall 9*a*, and the force storage member 10 can be supported with a first end region on the bearing portion 14. The force storage member 10 can include at least one helical spring, preferably at least one compression spring. A second end region of the force storage member 10 acts onto a pressure portion 20. The pressure portion 20 is hingedly connected to an intermediate lever 16 via an engagement location 18, the intermediate lever 16 being pivotable about the hinge axis 15. Upon a rotation of an adjustment element 19, a position of the engagement location 18 can be adjusted along a threaded spindle 17, thereby adjusting a force of the force storage member 10 acting onto the actuating arm arrangement 5. The actuating arm arrangement 5 includes at least one, preferably a plurality, of actuating arm(s) 5*a*, 5*b*, 5*c* for moving the movable furniture part 3. A fitting portion 21 is configured to be fixed to the movable furniture part 3, the fitting portion 21 having at least one or a plurality of fastening locations 22 and being configured to be releasably locked to the actuating arm arrangement 5. In FIG. 2*a*, the locked condition between the actuating arm arrangement 5 and the fitting portion 21 is shown.

A cover 12 is provided on the front-end of the housing wall 9*a*, the cover 12 having at least one laterally protruding flange 12*a*. In the shown embodiment, the flange 12*a* is substantially ring-shaped (i.e., hoop-shaped to surround an area) and forms a depth-stop for the housing 9, the depth-stop being configured to bear against the front face 6*a* of the furniture panel 6.

Figure 2B:
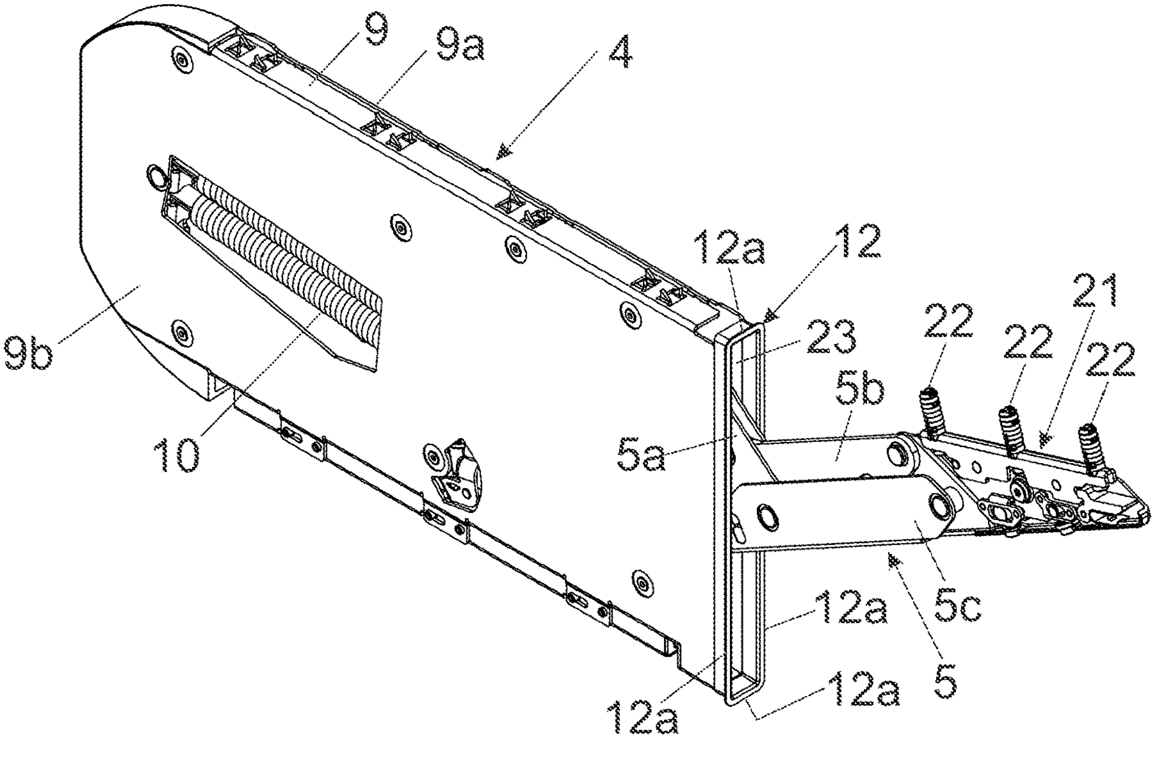

FIG. 2*b* shows the furniture drive 4 according to FIG. 2*a*, in which the housing 9 is closed by a second housing wall 9*b*. Each of the first housing wall 9*a* and the second housing wall 9*b* is configured to be flat and jointly form a substantially cuboidal housing 9. The housing walls 9*a*, 9*b* are mutually spaced from one another in a parallel relationship, and a front-sided opening 23 is formed between the housing walls 9*a*, 9*b*, and the cover 12 is arranged in a region of that opening 23 so that the flange 12*a* surrounds the opening 23, as shown in FIGS. 2*a* and 2*b*. At least one actuating arm 5*a*, 5*b*, 5*c* of the actuating arm arrangement 5 protrudes through the opening 23 of the housing 9 and through the cover 12 in at least one relative position. Preferably, the at least one relative position is a position in which the movable furniture part 3 is in a fully open condition.

Figure 3:
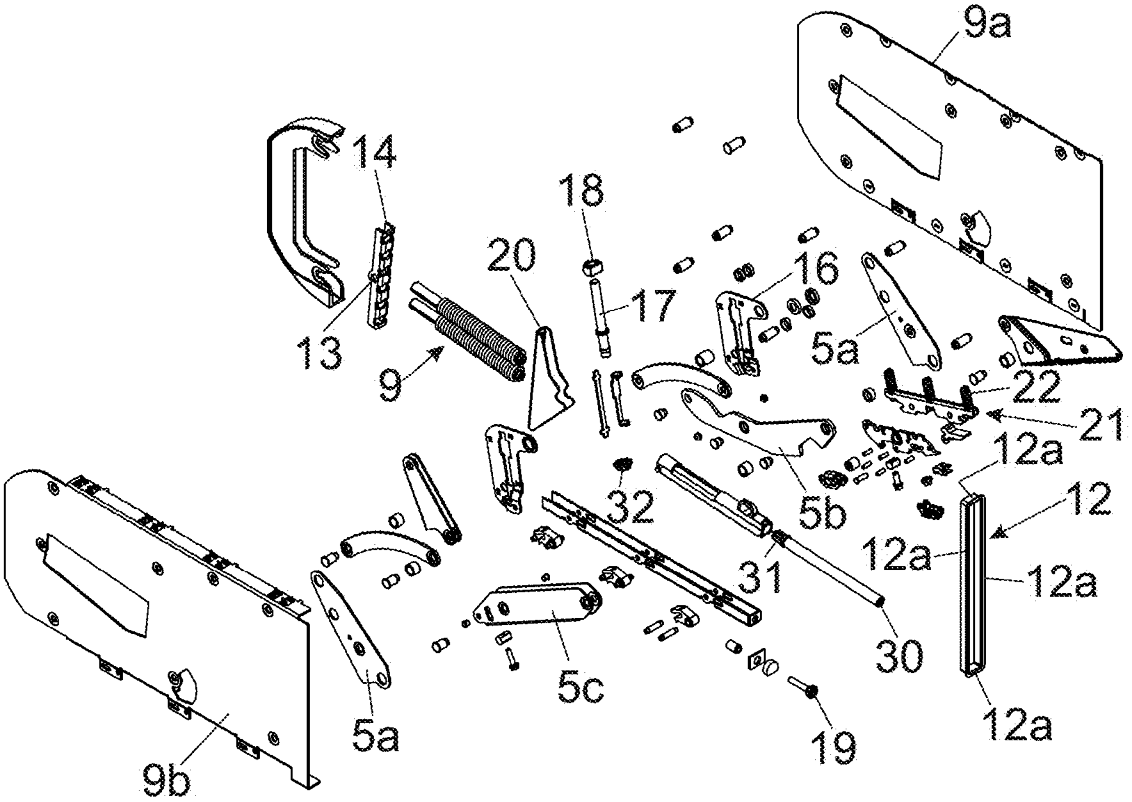
FIG. 3 shows the furniture drive in an exploded view.

FIG. 3 shows the furniture drive 4 in an exploded view. As best shown in FIG. 2*a*, cover 12 and the housing 9 (at least housing wall 9*a*) can be formed together to have an integral one-piece configuration. Alternatively, as shown in the exploded view of FIG. 3, the cover 12 can be configured as a component separate from the housing 9. According to an embodiment, the cover 12 can be formed by a material differing from the material of the housing walls 9*a*, 9*b*, whereby the aesthetical overall impression can be improved. The cover 12 can also be configured to be releasably fixed to the housing 9. This can be accomplished, for example, by at least one snap-connection device.

Figure 4A:
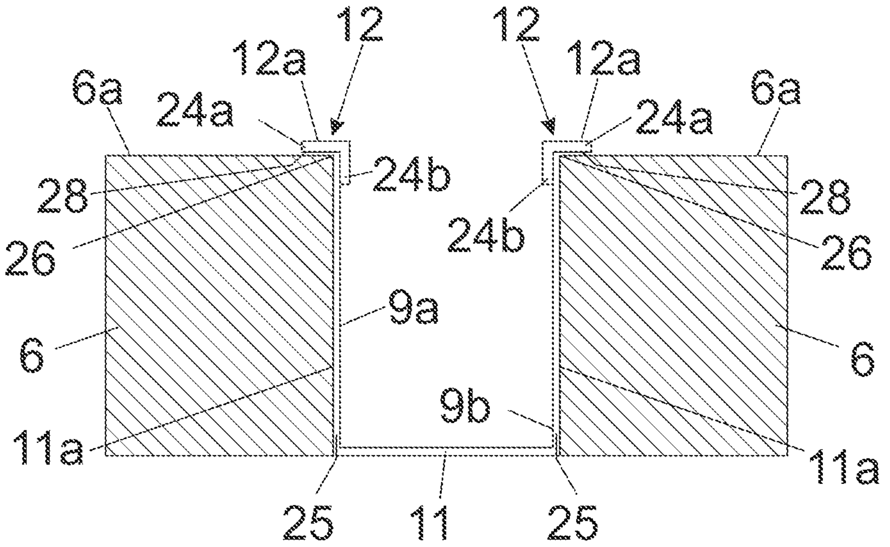
FIGS. 4*a*, 4*b* show two different embodiments of the furniture drive arranged on the furniture panel in a horizontal cross-sectional view.

FIG. 4*a* shows a horizontal perspective view of the housing 9 arranged on the furniture panel 6. A recess 11, preferably a blind hole, for receiving the housing 9 is arranged in the furniture panel 6. A rear side 28 of the laterally protruding flange 12*a* of the cover 12 forms a depth-stop for the housing 9 of the furniture drive 4, the depth-stop being configured to bear against a front face 6*a* of the furniture panel 6. In this way, the housing 9 of the furniture drive 4 can achieve a defined depth position in relation to the furniture panel 6 in a mounted condition. The laterally protruding flange 12*a* of the cover 12, in a mounted condition, is configured to cover a gap 25 formed between the housing 9 and an inner wall 11*a* of the recess 11. As a result, the gap 25 no longer comes into view from a furniture user's point of view. The laterally protruding flange 12*a* of the cover 12, in a mounted condition of the furniture drive 4, can be configured to cover an edge 26 of the furniture panel 6, the edge 26 being arranged between the front face 6*a* of the furniture panel 6 and an inner wall 11*a* of the recess 11. As a result, a laborious post-treatment of that edge 26 can be omitted, in particular when the edge 26 is somewhat frayed.

The cover 12 can have an L-shaped cross section at least in a portion of the cover 12. Thereby, a first limb 24*a* of the portion of the cover 12 with the L-shaped cross section, in a mounted condition of the furniture drive 4, is configured to bear against the front face 6*a* of the furniture panel 6. A second limb 24*b* of the L-shaped cross section, on the contrary, is configured to extend into the interior of the furniture panel 6 in a mounted condition of the furniture drive 4.

Figure 4B:
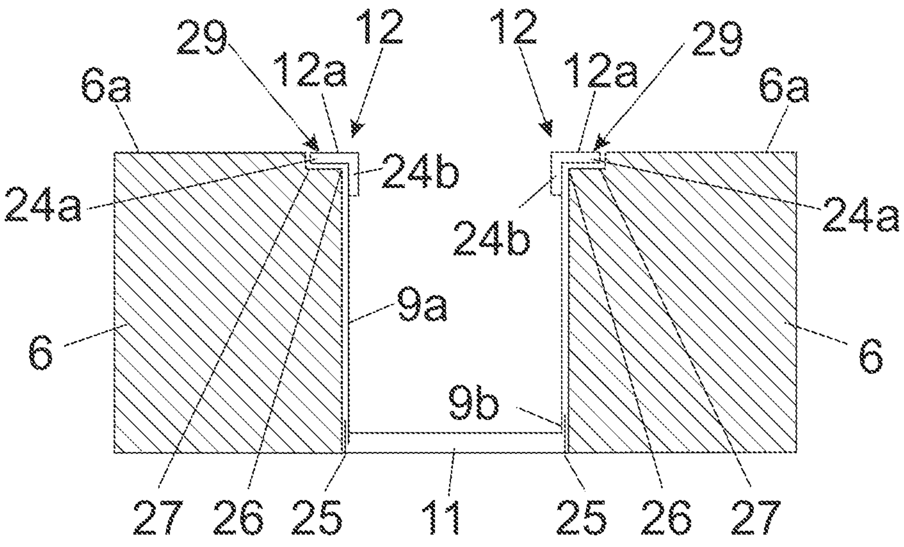

FIG. 4*b* shows a horizontal sectional view of the housing 9 arranged on the furniture panel 6, in which a rabbet 27 retreating from (inset within) the front face 6*a* of the furniture panel 6 is provided. With this embodiment, the first limb 24*a* of the cover 12, in a mounted condition of the furniture drive 4, bears against the rabbet 27 inset within the front face 6*a* of the furniture panel 6, so that a front side 29 of the L-shaped portion is flush with the front face 6*a* of the furniture panel 6. This provides the particular advantage that the housing 9, in relation to the recess 11, can be positioned both in a depth direction and in a lateral direction. With a ring-shaped flange 12*a*, the housing 9 can also positioned in a height direction with a defined stop.

The invention claimed is:

1. An item of furniture comprising:

a furniture carcass having a pair of furniture panels arranged at opposite lateral sides of the furniture carcass, each of the pair of furniture panels having opposite sidewall surfaces with a recess therebetween;

a movable furniture part movably mounted to the furniture carcass; and a furniture drive interchangeably integrated into the recess of either one of the furniture panels, the furniture drive being configured to move the movable furniture part relative to the furniture carcass, the furniture drive including:

a housing entirely received within the recess of either one of the furniture panels in a mounted condition;

an actuating arm arrangement including actuating arm mounted within the housing for moving the movable furniture part;

a horizontal adjustment element arranged within the housing and set back from an opening of the housing, the horizontal adjustment element being configured to allow adjustment of a force acting on the actuating arm; and a cover on the opening of the housing of the furniture drive, the cover having an opening and an L-shaped cross-sectional configuration including:

a limb extending into the recess and securely fixed to a wall of the housing, and a laterally protruding, rectangular-shaped flange connected to the limb and surrounding both the opening of the cover and the opening of the housing, the flange resting directly against a front surface of the one of the furniture panels such that a rear side of the flange of the cover forms a depth-stop for the housing, wherein the actuating arm of the actuating arm arrangement protrudes through the opening of the cover and the opening of the housing, and wherein the furniture drive is configured to allow access to the adjustment element within the housing via the opening of the housing and the opening of the cover when the movable furniture part is in an open position to thereby allow adjustment of the force acting on the actuating arm.

2. The item of furniture according to claim 1, wherein the wall of the housing is a first housing wall, and the housing further including a second housing wall, at least a portion of the second housing wall being spaced apart from the first housing wall.

3. The item of furniture according to claim 2, wherein the opening of the housing is formed between the first housing wall and the second housing wall, and the cover is arranged at the opening of the housing.

4. The item of furniture according to claim 3, wherein the actuating arm is a movably-supported actuating arm protruding through the opening of the housing.

5. The item of furniture according to claim 3, wherein the cover and the flange entirely surround the opening of the housing.

6. The item of furniture according to claim 1, wherein the cover is substantially rectangular-shaped when viewing the furniture carcass from a front side of the item of furniture.

7. The item of furniture according to claim 1, wherein a front face of the one of the furniture panels has a rabbet therein surrounding the recess, the flange of the cover bearing against the rabbet inset into the front face of the furniture panel so that a front side of the flange is flush with the front face of the furniture panel.

8. The item of furniture according to claim 1, wherein a material of the cover is different than a material of the housing.

9. The item of furniture according to claim 1, wherein the laterally protruding flange of the cover is configured to cover a gap between the housing and an inner wall of the recess.

10. The item of furniture according to claim 1, wherein the laterally protruding flange of the cover is configured to cover an edge of the furniture panel, the edge being arranged between a front face of the furniture panel and an inner wall of the recess.

11. The item of furniture according to claim 1, wherein the cover is nickel-plated.

12. The item of furniture according to claim 1, wherein the adjustment element is located below a mounting position of the actuating arm within the housing.

* * * * *